US009949356B2

(12) United States Patent
Namburu et al.

(10) Patent No.: US 9,949,356 B2

(45) Date of Patent: Apr. 17, 2018

(54) ELECTRODE FOR A PLASMA ARC CUTTING TORCH

(75) Inventors: Praveen Krishna Namburu, Mount Pleasant, SC (US); Jessie Michael Wilson, Hanahan, SC (US); Jackie Laverne Winn, Mount Pleasant, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 883 days.

(21) Appl. No.: 13/546,639

(22) Filed: Jul. 11, 2012

(65) Prior Publication Data

US 2014/0014630 A1 Jan. 16, 2014

(51) Int. Cl.
*B23K 10/00* (2006.01)
*H05H 1/34* (2006.01)

(52) U.S. Cl.
CPC ....... *H05H 1/34* (2013.01); *H05H 2001/3442* (2013.01)

(58) Field of Classification Search
CPC ......................... H05H 2001/3442; H05H 1/34
USPC .............. 219/121.36, 121.48, 121.49, 121.5, 219/121.51, 121.52
See application file for complete search history.

(56) References Cited

U.S. PATENT DOCUMENTS 2,906,858 A 9/1959 Morton, Jr.
2,907,863 A 10/1959 Stanchus
3,082,314 A 3/1963 Arata et al.
3,131,288 A 4/1964 Browning
3,204,076 A 8/1965 Browning
3,242,305 A 3/1966 Kane et al.
3,272,962 A 9/1966 Mauskapf
3,373,306 A 3/1968 Karlovitz
3,403,211 A 9/1968 Foex
3,476,906 A 11/1969 Rovan
3,534,388 A 10/1970 Ito et al.
3,536,885 A 10/1970 Mitchell
3,541,297 A 11/1970 Sunnen et al.
3,567,898 A 3/1971 Fein
3,588,594 A 6/1971 Yamamoto et al.
3,592,994 A 7/1971 Ford
3,601,578 A 8/1971 Gebel et al.
3,619,549 A 11/1971 Hogan et al.
(Continued)

FOREIGN PATENT DOCUMENTS

DE 102004049445 A1 4/2006
DE 202006018163 U1 3/2007
(Continued)

OTHER PUBLICATIONS

International Application No. PCT/IB2015/001412, International Search Report & Written Opinion, 12 pages, dated Feb. 9, 2016.
(Continued)

*Primary Examiner* — Dana Ross
*Assistant Examiner* — Kuangyue Chen

(57) ABSTRACT

An electrode for a plasma arc torch is provided with features for improving electrode wear. An emissive insert is received into a cavity formed along one end of the torch body. A portion of the emissive insert is separated from the torch body by a sleeve positioned along the insert near the emission surface of the insert. The sleeve can operate to slow the erosion of the electrode body and thereby improve overall electrode life.

12 Claims, 2 Drawing Sheets

(56) References Cited

U.S. PATENT DOCUMENTS 3,619,551 A 11/1971 Dobbs et al.
3,641,308 A 2/1972 Couch, Jr. et al.
3,643,580 A 2/1972 Siegel
3,644,782 A 2/1972 Sheer et al.
3,676,639 A 7/1972 Esiban et al.
3,757,568 A 9/1973 Fletcher et al.
3,770,935 A 11/1973 Tateno et al.
3,787,247 A 1/1974 Couch, Jr.
3,833,787 A 9/1974 Couch, Jr.
3,914,573 A 10/1975 Muehlberger
3,930,139 A 12/1975 Bykhovsky et al.
3,949,188 A 4/1976 Tateno
3,988,566 A 10/1976 Vogts et al.
4,029,930 A 6/1977 Sagara et al.
4,060,088 A 11/1977 Morrison, Jr. et al.
4,133,987 A 1/1979 Lakomsky et al.
4,163,891 A 8/1979 Komatsu et al.
4,174,477 A 11/1979 Essers et al.
4,175,225 A 11/1979 Holko et al.
4,203,022 A 5/1980 Couch, Jr. et al.
4,275,287 A 6/1981 Hiratake
4,282,418 A 8/1981 Wuestner
4,291,217 A 9/1981 Braun
4,341,941 A 7/1982 Tateno
4,361,748 A 11/1982 Couch, Jr.
4,382,170 A 5/1983 Klingel
4,389,559 A 6/1983 Rotolico et al.
4,410,788 A 10/1983 Summers et al.
4,421,970 A 12/1983 Couch, Jr.
4,506,136 A 3/1985 Smyth et al.
4,521,666 A 6/1985 Severance, Jr. et al.
4,567,346 A 1/1986 Marhic
4,625,094 A 11/1986 Marhic et al.
4,626,648 A 12/1986 Browning
4,645,899 A 2/1987 Bebber et al.
4,647,082 A 3/1987 Fournier et al.
4,663,512 A 5/1987 Kneeland et al.
4,692,582 A 9/1987 Marhic
4,701,590 A 10/1987 Hatch
4,743,743 A 5/1988 Fukatsu
4,748,312 A 5/1988 Hatch et al.
4,762,977 A 8/1988 Browning
4,764,656 A 8/1988 Browning
4,766,349 A 8/1988 Johansson et al.
4,782,210 A 11/1988 Nelson et al.
4,791,268 A 12/1988 Sanders et al.
4,803,405 A 2/1989 Nakano et al.
4,816,637 A 3/1989 Sanders et al.
4,839,489 A 6/1989 Dyer
4,861,962 A 8/1989 Sanders et al.
4,866,240 A 9/1989 Webber
4,882,465 A 11/1989 Smith et al.
4,902,871 A 2/1990 Sanders et al.
4,909,914 A 3/1990 Chiba et al.
4,918,283 A 4/1990 Yamade et al.
4,967,055 A 10/1990 Raney et al.
4,977,305 A 12/1990 Severance, Jr.
5,013,885 A 5/1991 Carkhuff et al.
5,017,752 A 5/1991 Severance, Jr. et al.
5,023,425 A 6/1991 Severance, Jr.
5,070,227 A 12/1991 Luo et al.
5,083,005 A 1/1992 Degrigny
5,089,221 A 2/1992 Johansson et al.
5,097,111 A * 3/1992 Severance, Jr. .......... 219/121.52
5,105,061 A 4/1992 Blankenship
5,120,930 A 6/1992 Sanders et al.
5,124,525 A 6/1992 Severance, Jr. et al.
5,132,512 A 7/1992 Sanders et al.
5,164,568 A 11/1992 Sanders
5,166,494 A 11/1992 Luo et al.
5,170,033 A 12/1992 Couch, Jr. et al.
5,235,162 A 8/1993 Nourbakhsh
5,295,030 A 3/1994 Tafreshi
5,317,126 A 5/1994 Couch, Jr. et al.
5,380,976 A 1/1995 Couch, Jr. et al.
5,393,952 A 2/1995 Yamaguchi et al.
5,396,043 A 3/1995 Couch, Jr. et al.
5,414,236 A 5/1995 Couch, Jr. et al.
5,414,237 A 5/1995 Carkhuff
5,424,507 A 6/1995 Yamaguchi
5,451,739 A * 9/1995 Nemchinsky et al. .. 219/121.51
5,464,962 A * 11/1995 Luo et al. ................ 219/121.52
5,468,026 A 11/1995 Annestedt
5,473,140 A 12/1995 Colling
5,548,097 A 8/1996 Couch, Jr. et al.
5,591,357 A 1/1997 Couch, Jr. et al.
5,601,734 A 2/1997 Luo et al.
5,624,586 A 4/1997 Sobr et al.
5,653,895 A 8/1997 Shintani
5,695,662 A 12/1997 Couch, Jr. et al.
5,717,187 A 2/1998 Rogozinski et al.
5,734,144 A 3/1998 Yamaguchi et al.
5,747,767 A 5/1998 Severence et al.
5,756,959 A 5/1998 Freeman et al.
5,756,960 A 5/1998 Rogozinski et al.
5,767,478 A * 6/1998 Walters .................... H05H 1/34
219/119
5,773,788 A 6/1998 Lu et al.
5,796,067 A 8/1998 Enyedy et al.
5,841,095 A 11/1998 Lu et al.
5,886,315 A 3/1999 Lu et al.
5,977,510 A 11/1999 Lindsay et al.
5,994,663 A 11/1999 Lu
6,020,527 A 2/2000 Chapuis et al.
6,020,572 A 2/2000 Marner et al.
6,028,287 A 2/2000 Passage et al.
6,054,669 A 4/2000 Warren, Jr.
6,066,827 A 5/2000 Nemchinsky
6,084,199 A 7/2000 Lindsay et al.
6,093,905 A 7/2000 Hardwick et al.
6,114,650 A 9/2000 Marner et al.
6,130,399 A 10/2000 Lu et al.
6,163,009 A 12/2000 Hardwick et al.
6,177,647 B1 1/2001 Zapletal
6,207,923 B1 3/2001 Lindsay et al.
6,329,627 B1 * 12/2001 Walters .................. B23K 10/00
219/121.5
6,403,915 B1 6/2002 Cook et al.
6,423,922 B1 7/2002 Nemchinsky et al.
6,424,082 B1 7/2002 Hackett et al.
6,452,130 B1 9/2002 Qian et al.
6,483,070 B1 * 11/2002 Diehl ...................... H05H 1/34
219/119
6,498,317 B2 12/2002 Hardwick
6,614,001 B2 9/2003 Hackett et al.
6,686,559 B1 2/2004 Walters et al.
6,841,754 B2 1/2005 Cook et al.
6,946,617 B2 9/2005 Brandt et al.
6,969,819 B1 11/2005 Griffin et al.
7,019,255 B2 3/2006 Brandt et al.
7,081,597 B2 7/2006 Severance, Jr. et al.
7,098,422 B2 8/2006 Krink et al.
7,193,174 B2 3/2007 Brandt et al.
7,256,366 B2 8/2007 Severance et al.
7,375,302 B2 5/2008 Twarog et al.
7,375,303 B2 5/2008 Twarog et al.
7,423,235 B2 9/2008 Severance, Jr. et al.
7,435,925 B2 10/2008 Griffin et al.
7,598,473 B2 10/2009 Cook et al.
7,605,340 B2 10/2009 Duan et al.
7,659,488 B2 2/2010 Cook et al.
7,754,993 B2 7/2010 Ortega et al.
7,829,816 B2 11/2010 Duan et al.
7,989,727 B2 8/2011 Twarog et al.
8,035,055 B2 10/2011 Twarog et al.
8,089,025 B2 1/2012 Sanders et al.
8,097,828 B2 1/2012 Roberts et al.
8,101,882 B2 1/2012 Mather et al.
D654,104 S 2/2012 Fitzpatrick et al.
8,115,136 B2 2/2012 Mather et al.
8,153,927 B2 4/2012 Twarog et al.
8,212,173 B2 7/2012 Liebold et al.
8,304,684 B2 11/2012 Smith et al.
8,338,740 B2 12/2012 Liebold et al.

(56) References Cited

U.S. PATENT DOCUMENTS

| | | | | |
|---|---|---|---|---|
| 8,389,887 | B2 | 3/2013 | Currier et al. | |
| 8,395,077 | B2 | 3/2013 | Duan et al. | |
| 8,525,069 | B1 | 9/2013 | Mather et al. | |
| 8,541,712 | B2 | 9/2013 | Mather et al. | |
| D692,402 | S | 10/2013 | Dalton et al. | |
| 8,546,718 | B2 | 10/2013 | Mather et al. | |
| 8,546,719 | B2 | 10/2013 | Warren, Jr. et al. | |
| 8,581,139 | B2 | 11/2013 | Severance, Jr. et al. | |
| 8,633,417 | B2 | 1/2014 | Ashtekar et al. | |
| 8,698,036 | B1 | 4/2014 | Kornprobst et al. | |
| 8,759,709 | B2 | 6/2014 | Mather et al. | |
| 8,772,667 | B2 | 7/2014 | Yang et al. | |
| 8,829,385 | B2 | 9/2014 | Yang et al. | |
| 2002/0135283 | A1 | 9/2002 | Hackett et al. | |
| 2002/0185475 | A1 | 12/2002 | Horner-Richardson et al. | |
| 2003/0034333 | A1 | 2/2003 | Horner-Richardson et al. | |
| 2004/0169018 | A1 | 9/2004 | Brasseur et al. | |
| 2006/0163216 | A1 | 7/2006 | Brandt et al. | |
| 2007/0125755 | A1* | 6/2007 | Mather | H05H 1/34 219/121.52 |
| 2009/0101629 | A1 | 4/2009 | Adams | |
| 2011/0240609 | A1* | 10/2011 | Jehnert | H05H 1/34 219/121.52 |
| 2012/0012560 | A1 | 1/2012 | Roberts et al. | |
| 2013/0043224 | A1 | 2/2013 | Leiteritz et al. | |
| 2013/0306607 | A1 | 11/2013 | Mather et al. | |
| 2014/0021175 | A1 | 1/2014 | Chen et al. | |
| 2014/0110382 | A1 | 4/2014 | Beliveau et al. | |

FOREIGN PATENT DOCUMENTS

| | | | |
|---|---|---|---|
| EP | 0729805 | A1 | 4/1996 |
| EP | 0790756 | A2 | 8/1997 |
| EP | 1 765 046 | A1 | 3/2007 |
| FR | 2014833 | | 4/1970 |
| FR | 2173875 | | 10/1973 |
| JP | 45-9853 | | 5/1970 |
| JP | 50-135721 | | 10/1975 |
| JP | 52-36725 | | 3/1977 |
| JP | 55-144337 | | 11/1980 |
| JP | 57-68270 | | 4/1982 |
| JP | 57-165370 | | 10/1982 |
| JP | 58-205676 | | 11/1983 |
| JP | 59-141371 | | 8/1984 |
| JP | 60-55221 | | 3/1985 |
| JP | 62-28084 | | 2/1987 |
| JP | 63-10082 | | 1/1988 |
| JP | 63-101076 | | 5/1988 |
| JP | 63-180378 | | 7/1988 |
| JP | 64-9112 | | 2/1989 |
| JP | 64-83376 | | 3/1989 |
| JP | 6-233025 | | 8/1994 |
| JP | 47-30496 | | 7/2011 |
| JP | 50-82357 | | 11/2012 |
| JP | 51-04251 | | 12/2012 |
| JP | 51-16379 | | 1/2013 |
| JP | 51-21945 | | 1/2013 |
| WO | WO 88/01126 | | 2/1988 |
| WO | WO 88/00476 | | 1/1989 |
| WO | WO 89/01281 | | 2/1989 |
| WO | WO 91/02619 | | 3/1991 |
| WO | 1999053734 | A1 | 10/1999 |
| WO | 200028794 | A1 | 5/2000 |
| WO | 2006113737 | A2 | 10/2006 |
| WO | 2008101226 | A1 | 2/2008 |
| WO | WO 2010/037380 | A2 | 4/2010 |
| WO | 2010111695 | A1 | 9/2010 |
| WO | 2012118826 | A1 | 9/2012 |
| WO | 2014187438 | A1 | 11/2014 |

OTHER PUBLICATIONS

International Application No. PCT/IB2015/000683 International Search Report & Written Opinion, 12 pages, dated Aug. 31, 2015.

International Application No. PCT/IB2015/000702, International Search Report & Written Opinion, 14 pages, dated Aug. 25, 2015.

International Application No. PCT/IB2015/000714, International Search Report & Written Opinion, 10 pages, dated Aug. 31, 2015.

International Application No. PCT/IB2015/001694, International Search Report & Written Opinion, 14 pages, dated Dec. 23, 2015.

PCT International Search Report for PCT/IB2013/001505; dated Dec. 11, 2013.

* cited by examiner

ELECTRODE FOR A PLASMA ARC CUTTING TORCH

FIELD OF THE INVENTION

The subject matter of the present disclosure relates generally to electrodes for plasma arc torches and, more particularly, to the configuration of emissive inserts for such electrodes.

BACKGROUND OF THE INVENTION

The operation of conventional plasma arc torches is well understood by those in the art. The basic components of these torches are a body, an electrode mounted in the body, a nozzle defining an orifice for a plasma arc, a source of ionizable gas, and an electrical supply for producing an arc in the gas. Upon start up, an electrical current is supplied to the electrode (generally a cathode) and a pilot arc is initiated in the ionizable gas typically between the electrode and the nozzle, the nozzle defining an anode.

A conductive flow of the ionized gas is then generated from the electrode to the work piece, wherein the work piece then defines the anode, and a plasma arc is thus generated from the electrode to the work piece. The ionizable gas can be non-reactive, such as nitrogen, or reactive, such as oxygen or air.

A longstanding problem with conventional plasma arc torches is the wear of the electrodes. Typically, the electrodes include a hafnium or zirconium insert. These materials are desired for their material properties when cutting with a reactive gas plasma but are extremely costly and require frequent replacement.

While not intending to be bound by any particular theory, it is believed that multiple factors contribute to electrode wear. For example, during operation of the torch, the insert material becomes extremely hot and enters a molten state as electrons are emitted from the high emissivity material to form the arc. Eventually, a hole or cavity may form at the exposed emission surface of the insert. This cavity, typically concave in shape, is formed due to the ejection of the molten, high emissivity material from the insert during operation. The ejection of material can occur at various times during the cutting process such as e.g., during initial start-up creation of the plasma arc, during cutting operations with the arc, and/or while or after stopping the plasma arc. The ejection of molten material not only provides wear of the insert but can also wear other parts of the torch such as the nozzle. More particularly, the molten material from the insert may be ejected from the electrode to the surrounding nozzle, which in turn can cause the arc to improperly attach to, and thereby damage, the nozzle.

Accordingly, an electrode having one or more features for improving wear would be useful. More particularly, an electrode that can reduce or minimize the ejection of molten material from the insert would be beneficial. Such an electrode that can also reduce or minimize damage to the portion of the electrode surrounding the insert would also be useful.

SUMMARY OF THE INVENTION

The present invention relates to an electrode for a plasma arc torch with features for improving electrode wear. An emissive insert is received into a cavity formed along one end of the torch body. A portion of the emissive insert is separated from the torch body by a sleeve positioned along the insert near the emission surface of the insert. The sleeve can operate to slow the erosion of the electrode body and thereby improve overall electrode life. Additional objects and advantages of the invention will be set forth in part in the following description, or may be apparent from the description, or may be learned through practice of the invention.

In one exemplary embodiment, the present invention provides an electrode for a plasma arc torch. The electrode includes an elongate body defining a longitudinal direction and comprising a high thermal conductivity material. The body has a face at a discharge end of the electrode. The body defines a bore extending along the longitudinal direction. An insert is received into the bore. The insert has an outer portion and an inner portion. The inner portion is in contact with the elongate body and the outer portion has an exposed emission surface that is recessed relative to the face of the elongate body. An annulus is received into the bore adjacent to the insert. The annulus separates the outer portion of the insert from the elongate body.

In another exemplary embodiment, the present invention provides an electrode for a plasma arc torch. The electrode includes an electrode body comprised of a thermally and electrically conductive metal. The electrode body has a face and a cavity positioned in the face. An insert is mounted in the cavity and comprises an emissive material having a work function less than the work function of the electrode body. The insert is positioned in contact with the electrode body. The insert is recessed relative to the face of the electrode body. A sleeve surrounds the insert and separates a portion of the insert near the face of the electrode body from the electrode body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION

Figure 1:
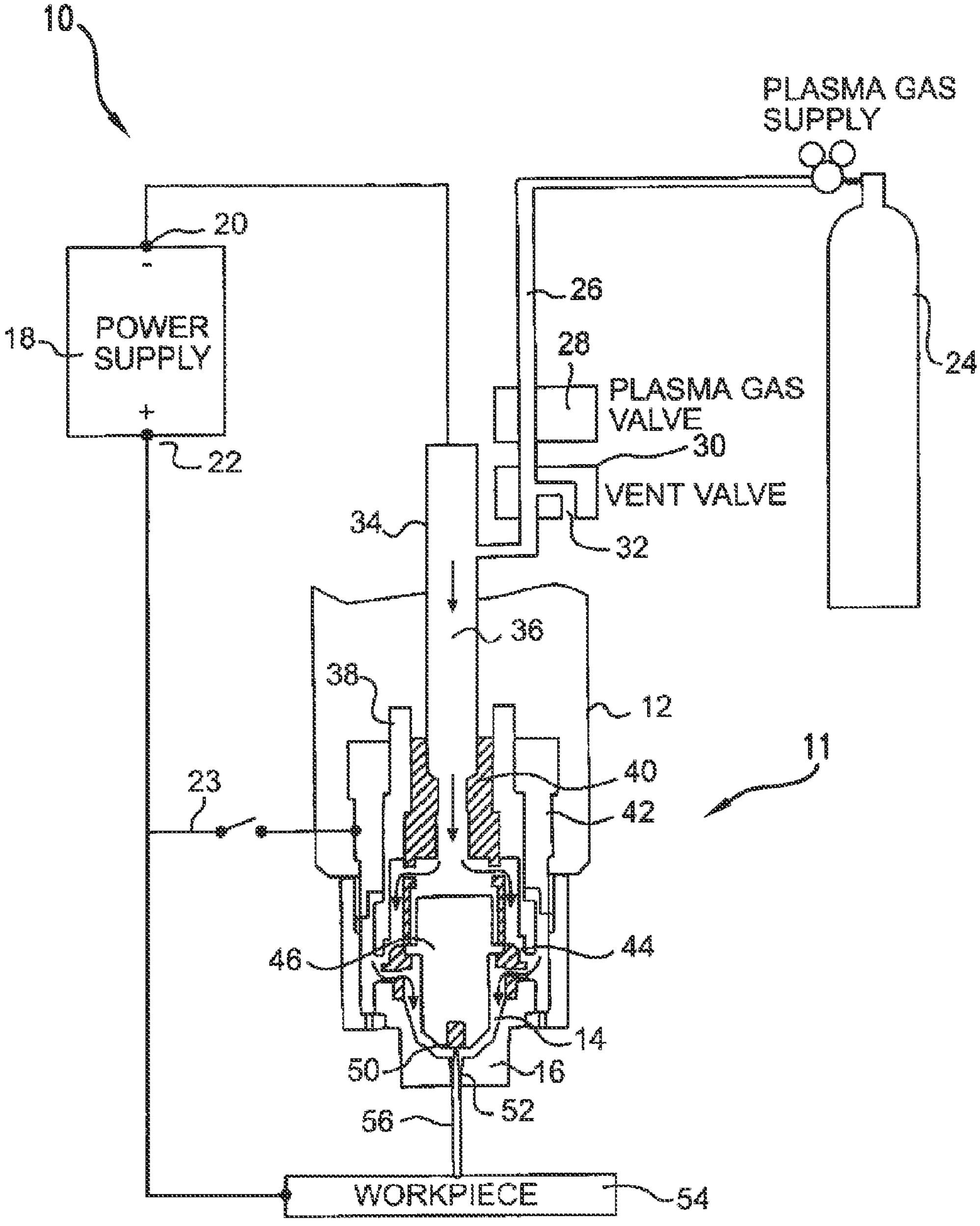
FIG. 1 provides a schematic view of an exemplary embodiment of plasma arc torch system of the present invention.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 is a simplified schematic view of an exemplary embodiment of a conventional plasma arc torch system 10. The exemplary embodiment shown in FIG. 1 is provided by way of example only. Other plasma arc torch systems of different configurations may be used with the present invention as well.

Plasma arc torch system 10 includes a plasma arc torch 11 that has a basic body, generally indicated as 12. Body 12 includes a torch supply tube 34 defining a supply chamber 36 that is supplied with a source of pressurized ionizable gas from gas supply 24 through gas supply line 26. A remotely actuated valve, such as solenoid valve 28, is disposed in line between supply tube 34 and gas source 24 to shut off the supply of gas to torch 10 upon actuation of the valve. As is appreciated by those skilled in the art, the plasma gas may be non-reactive, such as nitrogen, or reactive, such as oxygen or air.

Torch body 12 includes an elongate electrode body 46, typically formed from e.g., copper. An electrode insert or element 50 is fitted into the lower end of electrode body 46—exemplary embodiments of which will be more fully described below. Element 50 is typically formed of hafnium or zirconium, particularly when a reactive gas is used as the plasma gas.

An insulating body 38 generally surrounds the supply tube 34 and electrode body 46. A cathode body 40 is disposed generally surrounding supply tube 34 and an anode body 42 is disposed surrounding insulating body 38. A nozzle 16 is disposed at the forward end of electrode body 46 and defines an arc passageway 52 aligned with electrode insert 50. A swirl ring 44 is disposed around the electrode body 46 and has holes defined therein to induce a swirling component to plasma gas entering plasma gas chamber 14, as will be discussed in greater detail below.

A power supply 18 is provided to supply electrical current to electrode body 46 and electrode element 50. A negative power lead 20 is in electrical communication with supply tube 34 and cathode body 40. In a pilot arc mode, a positive power lead 22 is in electrical communication with anode body 42 through switch 23. Insulating body 38 electrically isolates anode body 42 from cathode body 40. Positive power lead 22 is also connectable to a work piece 54 that is to be cut by the plasma torch once switch 23 is opened. Power supply 18 may constitute any conventional DC power supply sufficient to provide current to the torch at an appropriate voltage to initiate the pilot arc and then maintain the arc in the operational cutting mode of the torch.

In operation, plasma gas flows from source 24, through supply line 26 and shut off valve 28 into chamber 36 of supply tube 34, as generally indicated by the arrows. The plasma gas flows downward in chamber 36 through orifices in the cathode body and orifices in swirl ring 44 before entering the lower plasma gas chamber 14. It should be understood that lower plasma gas chamber 14 is in pneumatic communication with the entirety of the supply chamber 36 of supply tube 34 so that a change in pressure anywhere within the system will effect a change in pressure within lower plasma gas chamber 14. In operation, a differential pressure exists between supply chamber 36 and lower plasma chamber 14 so that the plasma gas flows from supply chamber 36, through swirl ring 44, and out nozzle 16 with a swirling component induced thereto.

In the pilot arc mode of torch 10, switch 23 is closed so that the positive lead is connected to anode body 42. Power supply 18 provides current at the appropriate voltage to initiate the pilot arc between electrode element 50 and nozzle 16. A desired plasma gas flow and pressure are set by the operator for initiating the pilot arc. The pilot arc is started by a spark or other means, such as a contact starting technique, all of which are known in the art.

The plasma gas flow during the pilot arc mode is from supply 24, through supply line 26 and solenoid valve 28, into supply chamber 36, through orifices in cathode body 40, through the holes in swirl ring 44, into lower plasma chamber 14, and out through arc passageway 52 of nozzle 16. The swirling flow generated by swirl ring 44 is desired as a means for stabilizing the arc in the operational cutting mode so that the arc does not impinge on and damage the nozzle.

In order to transfer torch 10 to the cutting mode, the torch is brought close to work piece 54 so that the arc transfers to the work piece 54 as switch 23 opens so that positive power is fed only to work piece 54. The current is increased to a desired level for cutting such that a plasma arc 56 is generated which extends through arc passageway 52 to work piece 54. The operational current levels depend on the type of torch and application desired. For example, the operational current levels can range from about 20 to about 400 amps.

As the operational current is increased during the start of the cutting process, the plasma gas within lower plasma chamber 14 heats up and a decrease in plasma gas flow out of nozzle 16 results. In order to sustain sufficient plasma gas flow through nozzle 16 to sustain the plasma arc 56, the pressure of the plasma gas being supplied must be increased with the increase of current. Conversely, towards the end of the cutting process, reduction of the level of current and plasma gas flow can be carefully coordinated to e.g., prevent damage to the electrode.

Figure 2:
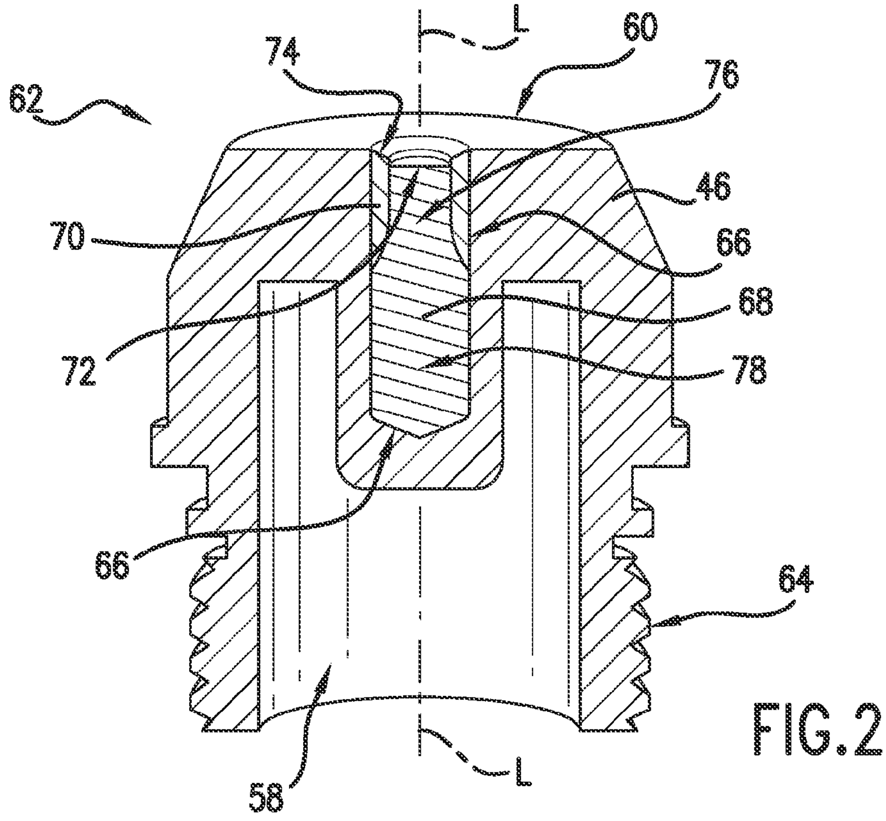
FIG. 2 is a cross-sectional view of an exemplary embodiment of an electrode of the present invention.

FIG. 2 provides a cross-sectional, side view of another exemplary embodiment of the elongate electrode body 46. Electrode body 46 defines a longitudinal direction L and has a face 60 positioned at discharge end 62. Electrode body 46 is constructed from a material that is highly conductive thermally and highly conductive electrically. For example, electrode body 46 may be constructed from copper or silver. Electrode body 46 may be constructed with various features for attaching body 46 to plasma arc torch 11. As shown, the exemplary embodiment of FIG. 2 includes threads 64 for complementary receipt into torch 11. Other configurations may also be used. Electrode body 46 also includes a chamber 58 that can be provided with e.g., a heat transfer fluid to help cool electrode body 46 during cutting operations.

Electrode body 46 defines a cavity or bore 66 that extends along longitudinal direction L from face 60. For this exemplary embodiment of electrode body 46, an insert 68 is received into bore 66. Insert 68 is constructed from a highly emissive material having a low electron work function such as e.g., hafnium, zirconium, tungsten, and alloys thereof. As such, insert 68 will readily emit electrons from emission surface 72 upon e.g., application of a sufficient electrical potential difference between insert 68 and an adjacent work piece. Notably, the electron work function of insert 68 is less than the electron work function of electrode body 46 such that the plasma arc is generated at emission surface 72.

Insert 68 includes two portions, namely, an outer portion 76 that includes emission surface 72 and an inner portion 78 that is concealed within electrode body 46. Inner portion 78 is in contact with electrode body 46. Such contact provides an electrical connection through which current may pass to generate the plasma arc at emission surface 72. Additionally, contact between inner portion 78 and electrode body 46 also provides for heat transfer away from the emissive insert 68.

Outer portion 76 provides the emission surface 72 where the plasma arc is preferably generated during operation of the torch system 10. As shown, outer portion 76 is separated from contact with electrode body 46 by a sleeve or annulus 70. More specifically, both insert 68 and annulus 70 are received into bore 66 of electrode body 46. However, outer portion 76 of insert 68 is enclosed within annulus 70 so that the end of insert 68 providing emission surface 72 is isolated from electrode body 46. For this exemplary embodiment, the exposed end of annulus 70 is also provided with a chamfered surface 74. Additionally, as shown, the emission surface 72 of outer portion 76 is recessed relative to the face 60 of electrode body 46.

Without being bound to any particular theory of operation, the inventors believe that by providing annulus 70 around the outer portion 76 of insert 68 while recessing insert 68 relative to face 60, annulus 70 provides a material that isolates insert 68 and acts differently than insert 68 during operation of plasma arc torch system 10. More specifically, without annulus 70, it is believed that material from recessed insert 68 will wet the exposed circumferential surface (see, e.g., surface 75 in FIG. 3) of bore 66 near face 60 to provide limited protection of electrode body 46 from wear. However, as the insert 68 wears, eventually emissive material from insert 68 no longer wets the exposed circumferential surface of bore 66 and the electrode body 46 will wear undesirably. Yet, the inventors have determined that by positioning annulus 70 around the recessed outer portion 76 of insert 68, the material of annulus 70 operates as a refractory to further shield the electrode body 46 and provide additional improvement in electrode wear. Chamfered edge 74 on annulus 70 can also further minimize wear of electrode body 46.

Additionally, in one exemplary embodiment of the invention, the material used for annulus 70 may comprise the same material used for insert 68. For example, both annulus 70 and insert 68 may be constructed of hafnium. Thus, even when annulus 70 and insert 68 are made of the same material, improvements in electrode wear may be had as annulus 70 acts to isolate insert 68 thermally and acts a refractory relative to the electrode body.

In other embodiments of the invention, annulus 70 is constructed from a different material than insert 68 and has a higher electron work function, a higher melting point temperature, or both, relative to the material used for insert 68. In still other embodiments of the invention, annulus 70 comprises an electrical and thermal insulator. For example, a ceramic material such as e.g., aluminum oxide, silicon carbide, and/or tungsten carbide may be used for annulus 70 to improve its ability to act as a refractory material.

Figure 3:
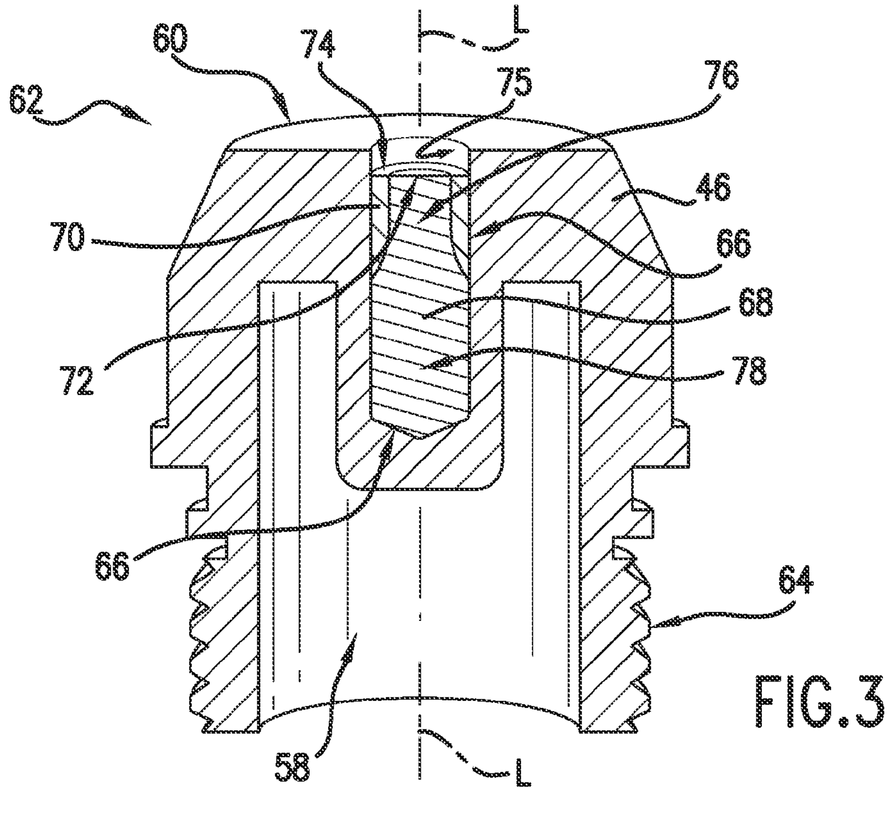
FIG. 3 is a cross-sectional view of another exemplary embodiment of an electrode of the present invention.

FIG. 3 provides another exemplary embodiment of the present invention similar to the embodiment of FIG. 2 except for the position of surface 74 of annulus 70 relative to face 60 of electrode body 46. More particularly, for this exemplary embodiment, both annulus 70 and insert 68 are recessed within bore 66 of electrode body 46. For this exemplary embodiment, it is believed annulus 70 still operates as a refractory to help isolate insert 68 from electrode body 46 as described for the embodiment of FIG. 2. The materials used for construction of annulus 70 and insert 68 are similar to that described for the exemplary embodiment of FIG. 2. In still other embodiments of the invention, annulus 70 may be recessed with respect to face 60 but is not flush with the emission surface 72 of insert 68.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An electrode for a plasma arc torch, comprising:

an elongate body defining a longitudinal direction and comprising a high thermal conductivity material, the elongate body having a face disposed at a discharge end of the electrode, the elongate body defining a bore extending along the longitudinal direction;

an insert received into said bore and having an outer portion and an inner portion, wherein the inner portion is in contact with said elongate body and the outer portion has an exposed emission surface that is recessed relative to the face of said elongate body; and an annulus receiving into said bore adjacent to said insert, said annulus separating the outer portion of said insert from the elongate body, wherein said entire annulus is recessed relative to said face of said elongate body, and wherein an entire end of said annulus is flush with the emission surface of said insert, exposing an internal surface of said bore near said end of said annulus.

2. An electrode for a plasma arc torch as in claim 1, wherein said annulus comprises a material with a work function greater than the work function of said insert.

3. An electrode for a plasma arc torch as in claim 1, wherein said annulus comprises a material with a melting point temperature greater than the melting point temperature of said insert.

4. An electrode for a plasma arc torch as in claim 1, wherein said annulus comprises a material with work function greater than the work function of said insert and with a melting point temperature greater than the melting point temperature of said insert.

5. An electrode for a plasma arc torch as in claim 1, wherein said annulus and said insert are each comprised of the same material.

6. An electrode for a plasma arc torch as in claim 5, wherein said annulus and said insert are each comprised of hafnium.

7. An electrode for a plasma arc torch, comprising:

an electrode body comprised of a thermally and electrically conductive metal, said electrode body having a face and a cavity positioned in the face;

an insert mounted in said cavity and comprising an emissive material having a work function less than the work function of the electrode body, said insert positioned in contact with said electrode body, said insert having an emissive surface being recessed relative to the face of said electrode body; and a sleeve surrounding said insert and separating a portion of the insert near the face of said electrode body from said electrode body, wherein said entire sleeve is recessed relative to said face of said electrode body, and wherein an entire end of said sleeve is flush with the emissive surface of said insert, exposing an internal surface of said cavity near said end of said sleeve.

8. An electrode for a plasma arc torch as in claim 7, wherein said sleeve comprises a material with a work function greater than the work function of said insert.

9. An electrode for a plasma arc torch as in claim 7, wherein said sleeve comprises a material with a melting point temperature greater than the melting point temperature of said insert.

10. An electrode for a plasma arc torch as in claim 7, wherein said sleeve comprises a material with work function greater than the work function of said insert and with a melting point temperature greater than the melting point temperature of said insert.

11. An electrode for a plasma arc torch as in claim 7, wherein said sleeve and said insert are each comprised of hafnium.

12. An electrode for a plasma arc torch, comprising:

an electrode body comprised of a thermally and electrically conductive metal, said electrode body having a face disposed at a discharge end of the electrode and a cavity positioned in the face;

an insert mounted in said cavity, said insert positioned in contact with said electrode body, said insert being recessed relative to the face of said electrode body; and a sleeve surrounding said insert and separating a portion of the insert near the face of said electrode body from said electrode body, wherein at least a portion of said sleeve adjacent to the discharge end is recessed relative to said face of said electrode body and is flush with an emissive surface of said insert, and wherein said sleeve comprises a material with work function greater than the work function of said insert and with a melting point temperature greater than the melting point temperature of said insert.

* * * * *